United States Patent
Bastelberger et al.

(10) Patent No.: US 7,972,424 B2
(45) Date of Patent: Jul. 5, 2011

(54) HYDROPHOBING ADDITIVE

(75) Inventors: Thomas Bastelberger, Emmerting (DE);
Reinhard Härzschel, Burghausen (DE);
Franz Jodlbauer, Marktl (DE)

(73) Assignee: Wacker Chemie AG, Munich (DE)

( * ) Notice: Subject to any disclaimer, the term of this patent is extended or adjusted under 35 U.S.C. 154(b) by 1177 days.

(21) Appl. No.: 10/557,658

(22) PCT Filed: May 13, 2004

(86) PCT No.: PCT/EP2004/005154
§ 371 (c)(1),
(2), (4) Date: Nov. 21, 2005

(87) PCT Pub. No.: WO2004/103928
PCT Pub. Date: Dec. 2, 2004

(65) Prior Publication Data
US 2006/0254468 A1    Nov. 16, 2006

(30) Foreign Application Priority Data
May 22, 2003  (DE) .................................. 103 23 205

(51) Int. Cl.
*C08L 23/00*  (2006.01)
(52) U.S. Cl. ............ 106/2; 525/269; 106/806; 106/810; 524/5; 524/267; 524/269
(58) Field of Classification Search .............. 106/2, 287, 106/524
See application file for complete search history.

(56) References Cited

U.S. PATENT DOCUMENTS

| | | | |
|---|---|---|---|
| 4,704,416 A * | 11/1987 | Eck et al. ......................... | 524/17 |
| 5,336,715 A * | 8/1994 | Sejpka et al. ................. | 524/765 |
| 5,959,017 A | 9/1999 | Eck et al. | |
| 2003/0164478 A1 * | 9/2003 | Fiedler et al. ................. | 252/500 |
| 2004/0019141 A1 * | 1/2004 | Bastelberger et al. ........ | 524/261 |
| 2004/0050287 A1 * | 3/2004 | Windridge et al. ............... | 106/2 |
| 2005/0098062 A1 * | 5/2005 | Butler et al. ...................... | 106/2 |

FOREIGN PATENT DOCUMENTS

| | | |
|---|---|---|
| CA | 2016447 A | 5/1990 |
| DE | 23 41 085 A1 | 3/1975 |
| DE | 100 49 127 A1 | 4/2002 |
| EP | 0 342 609 A2 | 11/1989 |
| EP | 0 717 016 A1 | 6/1996 |
| EP | 0811584 A1 | 10/1997 |
| EP | 1 193 287 A2 | 4/2002 |
| WO | WO 95/20627 | 8/1995 |
| WO | 0230846 A | 4/2002 |
| WO | WO 02/31036 A1 | 4/2002 |
| WO | WO0230847 * | 4/2002 |

OTHER PUBLICATIONS

Derwent Abstract Corresponding to DE 23 41 085 A1.
Derwent Abstract Corresponding to DE 100 49 127 A1.
Derwent Abstract Corresponding to EP 1 193 287 A2.
Noll, "Chemistry and Technology of the Silicones", $2^{nd}$ Edition, 1968, Weinheim.
Houben-Weyl, "Methoden der organischen Chemie" ("Methods of Organic Chemistry"), vol. E20, Georg Thieme Verlag Stuttgart (1987), pp. 2219-2236.

* cited by examiner

*Primary Examiner* — Melvin C Mayes
*Assistant Examiner* — Colette Nguyen
(74) *Attorney, Agent, or Firm* — Brooks Kushman P.C.

(57) ABSTRACT

Hydrophobicizing agents which are easily admixed with construction chemical products are prepared by providing a solution of a protective colloid and adding thereto a fatty acid compound sensitive to high pH environments, optionally, a hydrophobicizing organosilicon compound, and drying the resulting aqueous mixture.

22 Claims, No Drawings

HYDROPHOBING ADDITIVE

CROSS-REFERENCE TO RELATED APPLICATION

This application is the U.S. national phase of PCT Appln. No. PCT/EP04/005154 filed May 13, 2004, which claims priority to German application 103 23 205.2 filed May 22, 2003.

BACKGROUND OF THE INVENTION

1. Field of the Invention

The invention relates to a hydrophobicizing, water-redispersible additive based on fatty acids and their derivatives and, where appropriate, organosilicon compounds, to a process for their preparation, and to their use.

2. Description of the Related Art

Lime- or cement-bound construction materials, such as renders, trowelling compounds and construction adhesives need protection from the effects of weathering. Rain or snow causes wetting throughout the construction materials, for example the external render, as a result of capillary action, and this can lead to irreversible damage to the building. Hydrophobicization of the construction materials is a familiar and longstanding method of preventing this.

DE-A 2341085, EP-A 342609 and EP-A 717016 disclose that fatty acid esters may be added as hydrophobicizing agents to lime- or cement-bound renders. A frequent disadvantage here is specifically the hydrophobicizing character of these additives. If dry renders in which these hydrophobicizing agents are present are mixed with water the result is then poor wetting of the materials, and therefore markedly impaired processability.

Water-redispersible powders based on homo- or copolymers of ethylenically unsaturated monomers are used in the construction sector as binders, in combination with hydraulically setting binders, such as cement. By way of example, these are used in construction adhesives, renders, mortars, and paints to improve mechanical strength and adhesion. WO-A 95/20627, WO-A 02/31036 and DE-A 10233933 disclose that additives with hydrophobicizing action, such as organosilicon compounds and fatty acid esters, may be used as a constituent of redispersion powders in dry mortars. The problems of poor wettability and processability are thus circumvented. However, the hydrophobicizing effect is dependent on the proportion of the hydrophobicizing agent in the redispersion powder and cannot therefore be varied as desired.

EP-A 1193287 recommends powder compositions with at least one fatty acid ester for hydrophobicizing construction material compositions. To this end, the fatty acid ester is applied as described immediately above as a constituent of a redispersible polymer powder, with precisely the disadvantages described. Another embodiment proposes using the hydrophobicizing agent as dry substance, applied to an inert, inorganic carrier material, such as silica. A disadvantage here is that an inert substance is therefore introduced into the construction material composition, and this can have an adverse effect on its mechanical strength.

SUMMARY OF THE INVENTION

It was therefore an object to provide a hydrophobicizing additive which is intended for construction material compositions and which can be processed as a constituent of a dry mortar formulation without the difficulties mentioned, and which can be metered independently of other constituents of the formulation, and which does not reduce mechanical strength by introducing an inert substance.

DETAILED DESCRIPTION OF THE PREFERRED EMBODIMENT(S)

The invention therefore provides a hydrophobicizing water-redispersible additive based on fatty acids and their derivatives comprising a) from 30 to 95% by weight of one or more water-soluble protective colloids,
b) from 5 to 70% by weight of one or more compounds from the group consisting of
   b1) fatty acids and fatty acid derivatives which, under alkaline conditions, liberate fatty acid or liberate the corresponding fatty acid anion,
   where appropriate in combination with
   b2) one or more organosilicon compounds, and
c) from 0 to 30% by weight of antiblocking agents, the data in % by weight being based on the total weight of the additive and giving 100% by weight in total.

Materials suitable as component b1) are generally fatty acids and fatty acid derivatives which under alkaline conditions, preferably pH>8, liberate fatty acids or liberate the corresponding fatty acid anion. Preference is given to fatty acid compounds from the group of the fatty acids having from 8 to 22 carbon atoms, their metal soaps, their amides, and also their esters with monohydric alcohols having from 1 to 14 carbon atoms, with glycol, with polyglycol, with polyalkylene glycol, with glycerol, with mono-, di- or triethanolamine, with monosaccharides.

Suitable fatty acids are branched and unbranched, saturated and unsaturated fatty acids each having from 8 to 22 carbon atoms. Examples are lauric acid (n-dodecanoic acid), myristic acid (n-tetradecanoic acid), palmitic acid (n-hexadecanoic acid), stearic acid (n-octadecanoic acid), and also oleic acid (9-dodecenoic acid).

Suitable metal soaps are those of the abovementioned fatty acids with metals of $1^{st}$ to $3^{rd}$ main group or $2^{nd}$ transition group of the PTE, or else with ammonium groupings $NX_4^+$, where X is identical or different and is H, a $C_1$-$C_8$-alkyl radical, or a $C_1$-$C_8$-hydroxyalkyl radical. Preference is given to metal soaps with lithium, sodium, potassium, magnesium, calcium, aluminium, zinc, and with the ammonium groupings.

Suitable fatty acid amides are the fatty acid amides obtainable with mono- or diethanolamine and with the abovementioned $C_8$-$C_{22}$ fatty acids.

Fatty acid esters suitable as component b1) are the $C_1$-$C_{14}$-alkyl esters and $C_1$-$C_{14}$-alkylaryl esters of the $C_8$-$C_{22}$ fatty acids mentioned, preferably methyl, ethyl, propyl, butyl, ethylhexyl esters, and also the benzyl ester.

Other suitable fatty acid esters are the mono-, di- and polyglycol esters of the $C_8$-$C_{22}$ fatty acids.

Further suitable fatty acid esters are the mono- and diesters of polyglycols and/or of polyalkylene glycols having up to 20 oxyalkylene units, for example polyethylene glycol and polypropylene glycol.

Other suitable fatty acid esters are the mono-, di- and triesters of glycerol with the $C_8$-$C_{22}$ fatty acids mentioned, and also the mono-, di- and triesters of mono-, di- and triethanolamine with the $C_8$-$C_{22}$ fatty acids mentioned.

The fatty acid esters of sorbitol and mannitol are also suitable.

Particular preference is given to the $C_1$-$C_{14}$-alkyl esters and -alkylaryl esters of lauric acid and of oleic acid, monoand diesters of glycol with lauric acid and with oleic acid, and also the mono-, di- and triesters of glycerol with lauric acid and with oleic acid.

The specified fatty acids and fatty acid derivatives may be used alone or in a mixture. The amount generally used of component b1) is from 5 to 70% by weight, preferably from 10 to 40% by weight, based in each case on the total weight of the hydrophobicizing additive.

Where appropriate, the specified fatty acids and fatty acid derivatives may be used with organosilicon compounds b2). Suitable organosilicon compounds are the silicic esters $Si(OR')_4$, tetraorganosilanes $SiR_4$, organoorganoxysilanes $SiR_n(OR')_{4-n}$, where n=from 1 to 3, polysilanes preferably of the general formula $R_3Si(SiR_2)_nSiR_3$, where n=from 0 to 500, organosilanols $SiR_n(OH)_{4-n}$, di-, oligo- and polysiloxanes composed of units of the general formula $R_cH_dSi(OR')_e(OH)_fO_{(4-c-d-e-f)/2}$, where c=from 0 to 3, d=from 0 to 1, e=from 0 to 3, f=from 0 to 3 and c+d+e+f is not more than 3.5 per unit, where each R is identical or different and is a branched or unbranched alkyl radical having from 1 to 22 carbon atoms, cycloalkyl radical having from 3 to 10 carbon atoms, alkenyl radical having from 2 to 4 carbon atoms, or else aryl, aralkyl or alkylaryl radical having from 6 to 18 carbon atoms, and R' is identical or different alkyl radicals and alkoxyalkylene radicals each having from 1 to 4 carbon atoms, preferably methyl or ethyl, and where the radicals R and R' may also have substitution by halogens, such as Cl, by ether, thioether, ester, amide, nitrile, hydroxy, amine, carboxy, sulfonic acid, carboxylic anhydride or carbonyl groups, and where in the case of the polysilanes R can also have the meaning OR'. Other suitable materials are carbosilanes, polycarbosilanes, carbosiloxanes, polycarbosiloxanes, polysilylenedisiloxanes.

As component b2), preference is given to tetramethoxysilane, tetraethoxysilane, methyltripropoxysilane, methyltri(ethoxyethoxy)silane, vinyltri(methoxyethoxy)silane, (meth)acryloxypropyltrimethoxysilane, (meth)acryloxypropyltriethoxysilane, γ-chloropropyltriethoxysilane, β-nitriloethyltriethoxysilane, γ-mercaptopropyltrimethoxysilane, γ-mercaptopropyltriethoxysilane, phenyltriethoxysilane, isooctyltriethoxysilane, n-octyltriethoxysilane, hexadecyltriethoxysilane, dipropyldiethoxysilane, methylphenyldiethoxysilane, diphenyldimethoxysilane, methylvinyltri(ethoxyethoxy)silane, tetramethyldiethoxydisilane, trimethyltrimethoxydisilane, trimethyltriethoxydisilane, dimethyltetramethoxydisilane, dimethyltetraethoxydisilane, methylhydropolysiloxanes end-capped with trimethylsiloxy groups, copolymers end-capped with trimethylsiloxy groups and composed of dimethylsiloxane units and methylhydrosiloxane units, dimethylpolysiloxanes, and also dimethylpolysiloxanes whose terminal units have Si—OH groups. Most preference is given to the organoorganoxysilanes $SiR_n(OR')_{4-n}$, where n=from 1 to 3, in particular isooctyltriethoxysilane, n-octyltriethoxysilane, hexadecyltriethoxysilane.

The organosilicon compounds b2) may be used alone or in a mixture. The amount preferably used of component b2) is from 0.1 to 20% by weight, particularly preferably from 1 to 10% by weight, based in each case on the total weight of the hydrophobicizing additives The preparation of the organosilicon compounds mentioned may use processes as described in Noll, Chemie und Technologie der Silicone [Chemistry and technology of the silicones], 2nd edition 1968, Weinheim, and in Houben-Weyl, Methoden der organischen Chemie [Methods of organic chemistry], volume E20, Georg Thieme Verlag, Stuttgart (1987).

Suitable protective colloids are partially hydrolyzed and fully hydrolyzed polyvinyl alcohols; polyvinylpyrrolidones; polyvinyl acetals; polysaccharides in water-soluble form, such as starches (amylose and amylopectin), celluloses and their carboxymethyl, methyl, hydroxyethyl, hydroxypropyl derivatives; proteins, such as casein or caseinate, soya protein, gelatin; lignosulfonates; synthetic polymers, such as poly(meth)acrylic acid, copolymers of (meth)acrylates with carboxy-functional comonomer units, poly(meth)acrylamide, polyvinylsulfonic acids and their water-soluble copolymers; melamine-formaldehydesulfonates, naphthalene-formaldehydesulfonates, styrene-maleic acid copolymers and vinyl ether-maleic acid copolymers.

Preference is given to partially hydrolyzed or fully hydrolyzed polyvinyl alcohols with a degree of hydrolysis of from 80 to 100 mol %, in particular partially hydrolyzed polyvinyl alcohols with a degree of hydrolysis of from 80 to 95 mol % and with a Höppler viscosity of from 1 to 30 mPas, preferably from 3 to 15 mPas, in 4% strength aqueous solution (Höppler method at 20° C., DIN 53015).

Preference is also given to partially hydrolyzed or fully hydrolyzed, hydrophobically modified polyvinyl alcohols with a degree of hydrolysis of from 80 to 100 mol % and with a Höppler viscosity of from 1 to 30 mPas, preferably from 3 to 15 mPas, in 4% strength aqueous solution. Examples of these are partially hydrolyzed copolymers of vinyl acetate with hydrophobic comonomers, such as isopropenyl acetate, vinyl pivalate, vinyl ethylhexanoate, vinyl esters of saturated alpha-branched mono-carboxylic acids having 5 or from 9 to 11 carbon atoms, dialkyl maleates and dialkyl fumarates, such as diisopropyl maleate and diisopropyl fumarate, vinyl chloride, vinyl alkyl ethers such as vinyl butyl ether, alpha-olefins having from 2 to 12 carbon atoms, such as ethene, propene and decene. The proportion of the hydrophobic units is preferably from 0.1 to 10% by weight, based on the total weight of the partially or fully hydrolyzed polyvinyl alcohol. Particular preference is given to partially hydrolyzed or fully hydrolyzed copolymers of vinyl acetate with isopropenyl acetate with a degree of hydrolysis of from 95 to 100 mol %. It is also possible to use mixtures of the polyvinyl alcohols mentioned.

Most preference is given to partially hydrolyzed polyvinyl alcohols with a degree of hydrolysis of from 85 to 94 mol % and with a Höppler viscosity of from 3 to 15 mPas in 4% strength aqueous solution (Höppler method at 20° C., DIN 53015), and also to partially hydrolyzed or fully hydrolyzed polymers of vinyl acetate with isopropenyl acetate with a degree of hydrolysis of from 95 to 100 mol %. The polyvinyl alcohols mentioned are obtainable by processes known to the person skilled in the art.

To prepare the hydrophobicizing additives, component b) is stirred into an aqueous solution of the protective colloid a) and dried, for example by means of fluidized-bed drying, thin-film drying (drum drying), freeze drying or spray drying. The aqueous mixtures are preferably spray-dried. The spray drying takes place in conventional spray-drying systems, and the atomization method here may use single-, twin- or multifluid nozzles, or a rotating disc. The discharge temperature is generally selected in the range from 45 to 120° C., preferably from 60 to 90° C., depending on the system, the Tg of the resin and the desired degree of drying.

The total amount of protective colloid is to be from 30 to 95% by weight, based on the total weight of the hydrophobicizing additive; it is preferable to use from 40 to 70% by weight, based on the total weight of the hydrophobicizing additive.

A content of up to 1.5% by weight of antifoam, based on the proportion of component b), has often proven successful during the spraying process. In order to increase storage capability by improving resistance to blocking, an antiblocking agent (anticaking agent) may be added to the material, preferably at from 1 to 30% by weight, based on the total weight of the hydrophobic additive. Examples of antiblocking agents are calcium carbonate, magnesium carbonate, talc, gypsum, silica, kaolins, silicates with particle sizes preferably in the range from 10 nm to 10 μm.

The hydrophobicizing additives may be used in a variety of application sectors, for example in construction chemistry products, where appropriate in association with hydraulically setting binders, such as cements (Portland, alumina, pozzolanic, slag, magnesia, phosphate cement) or waterglass, or in gypsum-containing compositions, in lime-containing compositions, or in cement-free and polymer-bound compositions, for the production of construction adhesives, in particular tile adhesives and exterior insulation system adhesives, renders, trowelling compounds, floor-filling compositions, levelling compositions, sealing slurries, jointing mortars and paints. The amount generally added of the hydrophobicizing additive is from 0.1 to 10% by weight, based on the total weight of the mix to be hydrophobicized (without water content).

The hydrophobicizing additives are particularly advantageously used in the abovementioned application sectors in combination with water-redispersible polymer powders. The polymer powders termed water-redispersible polymer powders are those which in water break down again to give the primary particles, which are then dispersed in the water. Suitable polymers are those based on one or more monomers from the group consisting of vinyl esters of unbranched or branched alkanecarboxylic acids having from 1 to 15 carbon atoms, methacrylic esters and acrylic esters of alcohols having from 1 to 15 carbon atoms, vinylaromatics, olefins, dienes and vinyl halides. It is also possible to use mixtures of the polymers mentioned. In the applications mentioned it is preferable to use from 1 to 50% by weight of water-redispersible polymer powders, based on the total weight of the mix (without water content).

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having from 5 to 11 carbon atoms, e.g. VeoVa5®, VeoVa9®, VeoVa10® or VeoVa11® (tradename of Shell). Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate. Preferred vinylaromatics are styrene, methylstyrene and vinyl-toluene. Preferred vinyl halide is vinyl chloride. The preferred olefins are ethylene, propylene, and the preferred dienes are 1,3-butadiene and isoprene.

Where appropriate, the polymers may also contain from 0.1 to 10% by weight, based on the total weight of the polymer, of functional comonomer units from the group of the ethylenically unsaturated mono- or dicarboxylic acids, such as acrylic acid; that of the ethylenically unsaturated carboxamides, such as (meth)acrylamide, or from the group of the ethylenically unsaturated sulfonic acids and their salts, preferably vinylsulfonic acid, or from the group of the ethylenically polyunsaturated comonomers, such as divinyl adipate, diallyl maleate, allyl methacrylate or triallyl cyanurate, and/or from the group of the N-methylol(meth)acrylamides and their ethers, such as isobutoxy ether or n-butoxy ether.

Particularly preferred polymers are those listed below, the data in percent by weight giving a total of 100% by weight, where appropriate with the proportion of functional comonomer units:

From the group of the vinyl ester polymers, vinyl acetate polymers, vinyl acetate-ethylene copolymers with an ethylene content of from 1 to 60% by weight; vinyl ester-ethylene-vinyl chloride copolymers with an ethylene content of from 1 to 40% by weight and with a vinyl chloride content of from 20 to 90% by weight; vinyl acetate copolymers with from 1 to 50% by weight of one or more copolymerizable vinyl esters, such as vinyl laurate, vinyl pivalate, vinyl esters of an alpha-branched carboxylic acid, in particular vinyl versatates (VeoVa9$^R$, VeoVa10$^R$, VeoVa11$^R$), which, where appropriate, also contain from 1 to 40% by weight of ethylene; vinyl acetate-acrylate copolymers with from 1 to 60% by weight of acrylate, in particular n-butyl acrylate or 2-ethylhexyl acrylate, which, where appropriate, also contain from 1 to 40% by weight of ethylene.

From the group of the (meth)acrylic ester polymers, polymers of n-butyl acrylate or 2-ethylhexyl acrylate; copolymers of methyl methacrylate with n-butyl acrylate and/or 2-ethylhexyl acrylate, copolymers of methyl methacrylate with 1,3-butadiene.

From the group of the vinyl chloride polymers, besides the abovementioned vinyl ester-vinyl chloride-ethylene copolymers, vinyl chloride-ethylene copolymers and vinyl chloride-acrylate copolymers.

From the group of the styrene polymers, styrene-butadiene co-polymers and styrene-acrylate copolymers, such as styrene-n-butyl acrylate or styrene-2-ethylhexyl acrylate, each with a styrene content of from 10 to 70% by weight.

The polymers are prepared in a manner known per se, preferably by the emulsion polymerization process. Use may be made either of emulsifier-stabilized dispersions or of dispersions stabilized with protective colloid, such as polyvinyl alcohol. To prepare the water-redispersible polymer powders, the resultant polymer dispersion is dried. The method of drying may be spray drying, freeze drying, or coagulation of the dispersion followed by fluidized-bed drying. Spray drying is preferred.

The hydrophobicizing additives are used to provide hydrophobicizing agents which may be metered independently of other constituents of the formulation. Because the additive is redispersible, the problems occurring hitherto in the processing of hydrophobic additives are eliminated. The content of protective colloid is also advantageous, because in particular polyvinyl alcohol also acts as a binder and thus improves the mechanical strength of construction materials.

The examples below provide further illustration of the invention:

Example 1

10 parts by weight of methyl laurate were mixed with a mixture composed of 10 parts by weight of a 30% strength by weight aqueous solution of a polyvinyl alcohol with a Höppler viscosity of 13 mPas and with a degree of hydrolysis of 88 mol % and 90 parts by weight of a 30% strength by weight aqueous solution of a polyvinyl alcohol with a Höppler viscosity of 4 mPas and with a degree of hydrolysis of 88 mol %, and sprayed, using a twin-fluid nozzle. The dry powder was blended with 15 parts by weight of an antiblocking agent based on calcium magnesium carbonate.

Example 2

10 parts by weight of glycol monolaurate and 5 parts by weight of isooctyltriethoxysilane were mixed with a mixture composed of 10 parts by weight of a 30% strength by weight aqueous solution of a polyvinyl alcohol with a Höppler viscosity of 13 mPas and with a degree of hydrolysis of 88 mol % and 90 parts by weight of a 30% strength by weight aqueous solution of a polyvinyl alcohol with a Höppler viscosity of 4 mPas and with a degree of hydrolysis of 88 mol %, and sprayed, using a twin-fluid nozzle. The dry powder was blended with 15 parts by weight of an antiblocking agent based on calcium magnesium carbonate.

Example 3

20 parts by weight of propylene glycol dilaurate were mixed with 100 parts by weight of a 30% strength by weight aqueous solution of a polyvinyl alcohol with a Höppler viscosity of 4 mPas and with a degree of hydrolysis with 88 mol %, and sprayed, using a twin-fluid nozzle. The dry powder was blended with 15 parts by weight of an antiblocking agent based on calcium magnesium carbonate.

Comparative Example 4

100 parts by weight of a 30% strength by weight aqueous solution of a polyvinyl alcohol with a Höppler viscosity of 4 mPas and with a degree of hydrolysis of 88 mol % were sprayed, using a twin-fluid nozzle. The dry powder was blended with 15 parts by weight of an antiblocking agent based on calcium magnesium carbonate.

Performance Test:

The hydrophobicizing action of the substances mentioned was determined, using a dry mortar with the following composition:

| 280.0 | parts by weight | Dyckerhoff white cement |
| 500.0 | parts by weight | Quartz sand (0.1-0.4 mm) |
| 190.0 | parts by weight | Juraperle MHS |
| 1.5 | parts by weight | Tylose MH 10001 P4 |
| 4 | parts by weight | Hydrophobicizing agent |
| 24 | parts by weight | Water for 100 parts by weight of dry mixture |

Water Absorption Test:

A mortar layer of thickness 4 mm was applied by troweling onto expanded concrete. The specimens were sealed at the edges and immersed in water with the mortar layer downward. Water absorption in $kg/m^2h^{0.5}$ was determined from the weight increase per square meter and the time.

TABLE 1

| Ex. 1 | Ex. 2 | Ex. 3 | C. Ex. 4 |
| --- | --- | --- | --- |
| 0.5 | 0.05 | 0.34 | 1.8 |

What is claimed is:

1. A process for preparation of a hydrophobicizing, water-redispersible additive based on fatty acids and their derivatives comprising admixing
    a) from 30 to 95% by weight of one or more water-soluble protective colloids,
    b1) from 5 to 70% by weight of one or more compounds selected from the group consisting of fatty acids and fatty acid derivatives, which under alkaline conditions liberate fatty acid or liberate the corresponding fatty acid anion,
    b2) optionally, one or more organosilicon compounds, and
    c) from 0 to 30% by weight of antiblocking agents,
the data in % by weight being based on the total weight of the additive and totaling 100% by weight,
wherein said step of admixing comprises stirring components b1) and b2) into an aqueous solution of the protective colloid a) followed by drying to form a powdery dried additive.

2. The process of claim 1, wherein one or more components b1) are selected from the group consisting of fatty acids having from 8 to 22 carbon atoms, their metal soaps, their amides, and their esters with monohydric alcohols having from 1 to 14 carbon atoms, with glycol, with polyglycol, with polyalkylene glycol, with glycerol, with mono-, di- or triethanolamine, with monosaccharides.

3. The process of claim 1, wherein the component b1) comprises one or more fatty acid esters selected from the group consisting of
    $C_1$-$C_{14}$-alkyl esters and $C_{7-14}$-alkylaryl esters of branched and unbranched, saturated and unsaturated fatty acids having from 8 to 22 carbon atoms;
    mono-, di-, and polyglycol esters of branched and unbranched, saturated and unsaturated fatty acids having from 8 to 22 carbon atoms;
    mono- and diesters of polyglycols and polyalkylene glycols having up to 20 oxyalkylene units, with branched and unbranched, saturated and unsaturated fatty acids having from 8 to 22 carbon atoms;
    mono-, di- and triesters of glycerol with branched and unbranched, saturated and unsaturated fatty acids having from 8 to 22 carbon atoms;
    mono-, di- and triesters of mono-, di- and triethanolamine with branched and unbranched, saturated and unsaturated fatty acids having from 8 to 22 carbon atoms; and
    esters of sorbitol and of mannitol with branched and unbranched, saturated and unsaturated fatty acids having from 8 to 22 carbon atoms.

4. The process of claim 1, wherein component b2) comprises one or more organosilicon compounds selected from the group consisting of silicic esters, silanes, polysilanes, organosilanols, disiloxanes, oligosiloxanes, polysiloxanes, carbosilanes, polycarbosilanes, carbosiloxanes, polycarbosiloxanes, and polysilylenedisiloxanes.

5. The process of claim 1, wherein component b2) comprises one or more organosilicon compounds selected from the group consisting of silicic esters $Si(OR')_4$, tetraorganosilanes $SiR_4$, organoorganoxysilanes $SiR_n(OR')_{4-n}$ where n=from 1 to 3, polysilanes of the formula $R_3Si(SiR_2)_nSiR_3$ where n=from 0 to 500, organosilanols $SiR_n(OH)_{4-n}$, and di-, oligo- and polysiloxanes composed of units of the formula $R_cH_dSi(OR'')_e(OH)_fO_{(4-c-d-e-f)/2}$ where c=from 0 to 3, d=from 0 to 1, e=from 0 to 3, f=from 0 to 3 and c+d+e+f is not more than 3.5 per unit, where each R is identical or different and is a branched or unbranched alkyl radical having from 1 to 22 carbon atoms, a cycloalkyl radical having from 3 to 10 carbon atoms, alkenyl radical having from 2 to 4 carbon atoms, or an aryl, aralkyl or alkylaryl radical having from 6 to 18 carbon atoms, and R' is identical or different and is an alkyl radical or alkoxyalkylene radical each having from 1 to 4 carbon atoms, and where the radicals R and R' may also be substituted by halogen, by ether, thioether, ester, amide, nitrile, hydroxy, amine, carboxy, sulfonic acid, carboxylic anhydride or carbonyl groups, and where in the case of the polysilanes, R is optionally OR'.

6. The process of claim 1, wherein component a) comprises one or more protective colloids selected from the group consisting of
- partially hydrolyzed and fully hydrolyzed polyvinyl alcohols with a degree of hydrolysis of from 80 to 100 mol % and with a Höppler viscosity of from 1 to 30 mPas in 4% strength aqueous solution, and
- partially hydrolyzed and fully hydrolyzed, hydrophobically modified polyvinyl alcohols with a degree of hydrolysis of from 80 to 100 mol % and with a Höppler viscosity of from 1 to 30 mPas in 4% strength aqueous solution.

7. The process of claim 6, wherein at least one hydrophobically modified polyvinyl alcohol is present, and comprises partially hydrolyzed or fully hydrolyzed copolymers of vinyl acetate with one or more hydrophobic comonomers selected from the group consisting of isopropenyl acetate, vinyl pivalate, vinyl ethylhexanoate, vinyl esters of saturated alpha-branched monocarboxylic acids having 5 and from 9 to 11 carbon atoms, dialkyl maleates and dialkyl fumarates, vinyl chloride, vinyl alkyl ethers, and alpha-olefins having from 2 to 12 carbon atoms.

8. The process of claim 6, wherein component a) comprises one or more protective colloids selected from the group consisting of
- partially hydrolyzed polyvinyl alcohols with a degree of hydrolysis of from 85 to 94 mol % and a Höppler viscosity of from 3 to 15 mPas in 4% strength aqueous solution, and partially hydrolyzed and fully hydrolyzed copolymers of vinyl acetate with isopropenyl acetate with a degree of hydrolysis of from 95 to 100 mol %.

9. The process of claim 1, further comprising combining the dried additive with one or more water-redispersible polymer powders derived from at least one monomer selected from the group consisting of vinyl esters of unbranched or branched alkanecarboxylic acids having from 1 to 15 carbon atoms, methacrylic esters and acrylic esters of alcohols having from 1 to 15 carbon atoms, vinylaromatics, olefins, dienes and vinyl halides.

10. The process of claim 1, wherein component b1) is present in an amount of 10-40 weight percent.

11. The process of claim 1, wherein component b2) is present in an amount of 0.1 to 20 weight percent.

12. The process of claim 1, wherein component b2) is present in an amount of from 1 to 10 weight percent.

13. The process of claim 1, wherein drying is accomplished by spray drying.

14. A hydrophobicizing additive, prepared by the process of claim 1.

15. A hydrophobicizing additive, prepared by the process of claim 2.

16. A hydrophobicizing additive, prepared by the process of claim 3.

17. A hydrophobicizing additive, prepared by the process of claim 4.

18. A hydrophobicizing additive, prepared by the process of claim 5.

19. In a construction chemistry product wherein a hydrophobicizing additive is employed, the improvement comprising selecting as at least one hydrophobicizing additive, an additive of claim 14.

20. The construction chemistry product of claim 19, which contains at least one hydraulically settble inorganic binder.

21. The construction chemistry product of claim 19, which is one of construction adhesive, render, troweling compound, floor-filling composition, leveling composition, sealing slurry, jointing mortars or paints.

22. The construction chemistry product of claim 19, which least one inorganic binder is selected from the group consisting of cement, waterglass, gypsum, and lime.

* * * * *

UNITED STATES PATENT AND TRADEMARK OFFICE
CERTIFICATE OF CORRECTION

| | | |
|---|---|---|
| PATENT NO. | : 7,972,424 B2 | Page 1 of 1 |
| APPLICATION NO. | : 10/557658 | |
| DATED | : July 5, 2011 | |
| INVENTOR(S) | : Thomas Bastelberger et al. | |

It is certified that error appears in the above-identified patent and that said Letters Patent is hereby corrected as shown below:

Column 8, Line 54, Claim 5:

Delete: "$R_cH_dSi(OR")_e(OH)_fO_{(4-c-d-e-f)/2}$"

and insert: -- $R_cH_dSi(OR')_e(OH)_fO_{(4-c-d-e-f)/2}$ --

Signed and Sealed this
Eighteenth Day of October, 2011

David J. Kappos
*Director of the United States Patent and Trademark Office*